(12) United States Patent
Pieterman

(10) Patent No.: US 9,718,143 B2
(45) Date of Patent: Aug. 1, 2017

(54) PROJECTION WELDING OF METAL SHEETS

(71) Applicant: AL-S TECHNOLOGY B.V., Amersfoort (NL)

(72) Inventor: Karel Pieterman, Amersfoort (NL)

(73) Assignee: AL-S TECHNOLOGY B.V. (NL)

( * ) Notice: Subject to any disclaimer, the term of this patent is extended or adjusted under 35 U.S.C. 154(b) by 0 days.

(21) Appl. No.: 15/021,672

(22) PCT Filed: Sep. 10, 2014

(86) PCT No.: PCT/NL2014/050617
§ 371 (c)(1),
(2) Date: Mar. 11, 2016

(87) PCT Pub. No.: WO2015/037986
PCT Pub. Date: Mar. 19, 2015

(65) Prior Publication Data
US 2016/0221109 A1 Aug. 4, 2016

(30) Foreign Application Priority Data

Sep. 16, 2013 (NL) ...................................... 2011446

(51) Int. Cl.
*B23K 11/14* (2006.01)
*B23K 11/18* (2006.01)
(Continued)

(52) U.S. Cl.
CPC .............. *B23K 11/14* (2013.01); *B23K 11/18* (2013.01); *B23K 11/185* (2013.01); *B23K 11/20* (2013.01); *B23K 11/24* (2013.01)

(58) Field of Classification Search
CPC ....... B23K 11/14; B23K 11/18; B23K 11/185; B23K 11/20; B23K 11/24; B23K 2203/10;
(Continued)

(56) References Cited

U.S. PATENT DOCUMENTS

| 1,020,056 | A | * | 3/1912 | Rietzel | ................... | B23K 11/14 |
| | | | | | | 105/410 |
| 3,114,030 | A | * | 12/1963 | Ruskin | ................... | B23K 11/14 |
| | | | | | | 219/93 |

(Continued)

FOREIGN PATENT DOCUMENTS

| DE | 3024333 | 6/1980 | ............. B23K 11/14 |
| DE | 10029352 | 6/2000 | ............. B23K 11/11 |

(Continued)

OTHER PUBLICATIONS

Transmittal of International Preliminary Report on Patentability, PCT/NL2014/050617; Date of Mailing Jan. 20, 2016; (16 pgs).

(Continued)

*Primary Examiner* — Geoffrey S Evans
(74) *Attorney, Agent, or Firm* — Hayes Soloway P.C.

(57) ABSTRACT

The invention relates to projection welding of a second metal sheet above a first metal sheet (50), wherein the first metal sheet is of a non-ferrous metal or metal alloy having as main component aluminum or magnesium, wherein the first metal sheet comprises an elongate projection that locally extends above the main upper surface of the first metal sheet to come into contact with the main lower surface of the second metal sheet, wherein the projection comprises an upper surface having a convex first section (65) with a first radius (R1) that defines in its middle the top height of the upper surface with respect to the main upper surface of the first metal sheet, and a convex second section (64) with a second radius (R2) along both elongate sides that merge (Continued)

into the first section, wherein the first radius is larger than the second radius.

18 Claims, 10 Drawing Sheets

(51) Int. Cl.
*B23K 11/20* (2006.01)
*B23K 11/24* (2006.01)

(58) Field of Classification Search
CPC ....... B23K 2203/15; B32B 3/06; B32B 3/263; B32B 3/30; B32B 15/01; B32B 15/016; B32B 15/017; Y10T 428/12229; Y10T 428/12264; Y10T 428/12347; Y10T 428/12382; Y10T 428/12389; Y10T 428/12396; Y10T 428/12451
See application file for complete search history.

(56) References Cited

U.S. PATENT DOCUMENTS

| | | | |
|---|---|---|---|
| 4,427,869 A * | 1/1984 | Kimura | B23K 11/14 219/86.9 |
| 4,495,397 A | 1/1985 | Opprecht et al. | 219/93 |
| 5,283,413 A * | 2/1994 | Favre-Tissot | B23K 11/18 219/93 |
| 6,281,466 B1 | 8/2001 | VanOtteren et al. | 219/118 |
| 6,918,597 B2 | 7/2005 | Egloff | 277/594 |
| 2009/0316418 A1 * | 12/2009 | Mittler | B23K 33/00 219/121.63 |
| 2012/0156561 A1 * | 6/2012 | Onose | B23K 11/14 429/211 |

FOREIGN PATENT DOCUMENTS

| | | | |
|---|---|---|---|
| EP | 0102927 | 8/1983 | ............. B23K 11/14 |
| JP | 53-119249 A * | 10/1978 | |
| JP | H06-170549 | 6/1994 | ............. B23K 11/14 |
| JP | 09-010955 A * | 1/1997 | |
| JP | 11-342474 A * | 12/1999 | |
| JP | 2002-103056 | 4/2002 | ............. B23K 20/00 |
| JP | 2002-361440 A * | 12/2002 | |
| JP | 2004-358499 A * | 12/2004 | |
| WO | WO99/03634 | 1/1999 | ............. B23K 11/18 |
| WO | WO 01/00363 | 1/2001 | ............... B23K 1/00 |

OTHER PUBLICATIONS

International Search Report; PCT/NL2014/050617; Date of Mailing Feb. 11, 2015; (5 pgs).
Written Opinion of the International Searching Authority; PCT/NL2014/050617; Date of Mailing Feb. 11, 2015; (6 pgs).

* cited by examiner

PROJECTION WELDING OF METAL SHEETS

BACKGROUND

The invention relates to projection welding of metal sheets.

Projection welding is known for long for welding thin iron sheets above each other, for example in the car manufacturing industry wherein flanges of doors are welded together. A hollow projection is formed in the lower iron sheet by pressing a punch and a die against the sheet before the welding is executed. The sheets are subsequently pressed between two welding electrodes of a welding gun. During welding the projection gradually collapses and a strong structural weld is formed at the place of the projection.

In particular in the car industry there is a growing need for parts that are made of nonferrous metal sheets, in particular sheets of aluminum or magnesium and alloys thereof. These lightweight parts have the same good mechanical properties. However, when the known projection welding process for iron sheets is applied for these metals, there is not obtained a strong structural weld. On the contrary, the projection already collapses before the forming of a weld is started.

In published patent applications prior attempts to projection weld aluminum sheets have been described. However, these initial attempts have not lead to an successful implementation yet, as the applicant has now found out that the critical process parameters to obtain a strong structural weld were not known yet. In general, the described developments to projection weld aluminum sheets were only slight modifications of the process for iron sheets, while it is now found out that a complete different approach is necessary to obtain good results. The developments in the published patent applications are summarized hereafter.

WO 99/03634 in the name of Newcor Inc. discloses the projection welding of aluminum sheets wherein the projection in the lower sheet has the form of a dome. The projection has a height that is about four times the sheet thickness, whereby the projection is very, thin walled and hollow above the main upper surface of the lower sheet. This structurally weak projection will result in a large initial impression or will even collapse immediately after the pressure force is applied, whereby the initial welding contact area is undefined. The welding current is directly obtained from a conventional single phase, 460 Volt, 60 Hz, alternating current mains which is basically sinusoidal in form, wherein welding pulses are generated by breaking the half cycle waves thereof. By applying subsequent, alternating welding pulses onto the undefined initial welding contact, the amount of welding energy that is introduced, in particular at the beginning of the welding cycle, is not under control or to low, whereby a weak weld is obtained.

WO 01/00363 in the name of Newcor Inc. discloses a further development of the process as described here before. The ring shaped projection comprises a hollow upright wall with a curvature. The projection bounds a blind opening that inevitably encloses an amount of air that rapidly expands during the welding cycle. This causes cracks, inclusions and contamination originating from the enclosed air, resulting in a weak weld.

EP 0 102 927 discloses a projection welding process wherein both aluminum sheets are provided with elongate projections that abut each other in a crosswise orientation. Due to the presence of two abutting projections the welding spot will be visible on both sides of the product. This technology can only be applied to low cost utility products such as ducts as disclosed. The upper surface of the projections has a curvature, wherein the initial small welding contact between the crossing projections keeps the initial welding current low. The welding current gradually increases during the collapse of the projections. This implies that the current is dependent on the cross section of the melt only, keeping the control of the welding cycle rather low.

U.S. Pat. No. 4,495,397 discloses the projection welding of aluminum sheets with ring shaped projections, which, causes cracks, inclusions and contamination in the weld originating from the enclosed air. The projections are formed between a punch and a die with straight cold forging faces that are under an angle with each other. The projections have well defined straight side surfaces that are imposed by the die, while the top surface and its curvature are left undefined. This is a straightforward application of the punch and die for welding steel sheets, which will not work for aluminum. During the welding cycle a first pressure force is applied which causes a permanent cold deformation of 8%. The first pressure force is subsequently increased immediately after the welding current has peaked. The welding current is thus controlled by changing the pressure force as leading parameter. This already indicates that the welding current itself is not well under control. Besides that, it is practically impossible to control the pressure force in such way over the short welding cycle, as the pressure force is applied by a mechanically slow system. It seems that the pressure force is changed during the welding cycle in order to compensate other disadvantages somehow.

JP 2002-103056 discloses the projection welding process for aluminum similar to the welding process of U.S. Pat. No. 4,495,397, using ring shaped projections that causes cracks, inclusions and contamination in the welds. The welding process is applied for thick aluminum parts, not for thin sheets.

DE 30 24 333 discloses a cone shaped projection for welding aluminum parts, which is derived from the welding of steel sheets in the same straightforward way as described here before.

DE 100 29 352 describes the projection welding of aluminum sheets with a projection similar to the projection as disclosed in WO 99/03634. The projection has a height that is about two times the sheet thickness, whereby the projection is very thin walled and hollow above the main upper surface of the lower sheet. This projection will suffer from initial impression or will even collapse immediately after the pressure force is applied. The top of the projection has a constant radius and straight side surfaces. This shape comes straight forward from the projection welding of steel sheets. For these reasons this will fail for aluminum.

In the known techniques any oxidation of the objects to be welded needs to be removed prior to welding. In this regard JP06-170549 discloses a process in which the aluminum objects to be welded are reciprocally moved and rotated at the spot of a ring shaped projection for local removal of oxidation prior to welding. However, this cannot be applied, when projection welds are sequentially made between the same objects, as the earlier welds mutually fixate the objects.

It is an object of the present invention to provide a projection and a projection welding method for welding metal sheets of which at least one metal sheet is a nonferrous metal sheet.

SUMMARY OF THE INVENTION

According to a first aspect, the invention provides a set of a first metal sheet and a second metal sheet to be welded above the first metal sheet by means of projection welding, wherein the first metal sheet is of a non-ferrous metal or metal alloy having as main component aluminum or magnesium, wherein the first metal sheet comprises an elongate projection that locally extends above the main upper surface of the first metal sheet to come into contact with the main lower surface of the second metal sheet, wherein the projection comprises an upper surface having a convex first section with a first radius that defines in its middle the top height of the upper surface with respect to the main upper surface of the first metal sheet, a convex second section with a second radius along both elongate sides that merge into the first section, and a third section along both elongate sides that merge into the second sections and into the main upper surface of the first metal sheet, wherein the first transitions of the convex first section into the second convex sections define a first width of the upper surface and wherein the second transitions of the convex second sections into the third sections define a second width of the upper surface, and wherein the third transitions of the third sections into the main upper surface of the first metal sheet define a third width of the upper surface, wherein the first radius is larger than the second radius.

The second sheet can be made of iron, or the second metal sheet can be made of a non-ferrous metal or metal alloy having as main component aluminum of magnesium like the first sheet. During welding a welding electrode applies a pressure force onto the sheets at the position of the projection. The projection of the lower non-ferrous metal sheet comprises according to the invention an upper surface having a convex first section on top with a first radius that merges into the convex second sections with the second radius, wherein the first radius is larger than the second radius. In this manner the projection has a relatively broad convex first section that leads to a progressively growing initial contact surface at the top due to local elastic and plastic depression of the sheet material. The welding current will be locally conducted very well via this initial contact surface while the projection itself can withstand and counteract the pressure force that is applied during welding to such extend that a strong structural weld is formed. The projection does not collapse prematurely during welding the metal sheets. This projection allows direct welding of the sheets without prior removal of oxidation.

In a quantified embodiment the ratio first radius/second radius is at least 4.

In particular, the ratio first radius/second radius is 4 to 5.

More particularly, the ratio first radius/second radius is 4.5.

In an additionally quantified embodiment the ratio first width/second width is 0.60 to 0.90.

In particular, the ratio first width/second width is 0.70 to 0.80.

More particularly, the ratio first width/second width is 0.75.

In an embodiment the third section is a concave third section with a third radius, wherein the third radius is equal to the second radius. In this manner the upper surface gradually merges into the main upper surface of the first metal sheet, whereby the resistance against premature collapse of the projection during the welding process is improved.

In an embodiment the projection is full of metal of the first metal sheet above the main upper surface of the first metal sheet. This fraction of metal above the main upper surface provides the material to form the weld and it improves the resistance against premature collapse of the projection during the welding process.

In an embodiment the projection comprises an indentation in the lower main surface of the first metal sheet. This indentation is formed to provide the fraction of the material of the projection that is forged above the main upper surface.

In an embodiment thereof the deepest point of the indentation is located below the main upper surface of the first metal sheet.

In a quantified embodiment the projection has between its upper surface and its indentation a material thickness of at least 0.3 millimeter.

In a quantified embodiment the third width is 1 to 4 millimeter.

In particular, the third with is 1.8 millimeter.

In a quantified embodiment the length of the projection between the transition with the main upper surface of the first metal sheet is 2 to 12 millimeter.

In particular, the length of the projection between the transition with the main upper surface of the first metal sheet is 6 millimeter.

In an embodiment the second metal sheet is of a non-ferrous metal or metal alloy having as main component aluminum or magnesium.

According to a second aspect, the invention provides a method for projection welding a second metal sheet above a first metal sheet by means of projection welding with a projection welding apparatus, wherein the first metal sheet is of a non-ferrous metal or metal alloy having as main component aluminum or magnesium, wherein the first metal sheet comprises an elongate projection that locally extends above the main upper surface of the first metal sheet to come into contact with the main lower surface of the second metal sheet, wherein the projection welding apparatus comprises a first welding electrode and a second welding electrode that engage onto the first metal sheet and second metal sheet at the position of the projection to exert a pressure force onto the metal sheets and to subsequently feed a current through the metal sheets, wherein the method comprises feeding a welding current through the welding electrodes according to a pulse, wherein the pulse comprises in series a first trajectory over a first time interval in which the current rises from zero to a maximum current, a second trajectory over a second time interval in which the maximum current is present, a third trajectory in which the current gradually decreases back to zero over a third time interval, and a fourth trajectory in which the welding current over a fourth time interval is kept zero while the pressure force is still applied.

This method particularly relates to a double sided single weld configuration in which one projection weld is made between the two welding electrodes. The second sheet can be made of iron, or the second metal sheet can be made of a non-ferrous metal or metal alloy having as main component aluminum of magnesium like the first sheet. The pulse comprises in series the second trajectory in which the maximum welding current is present, followed by the third trajectory in which the welding current gradually decreases back to zero. This is found to be necessary to obtain a strong structural weld in these metal sheets by means of projection welding. During the welding the projection plastically collapses, which is a hot forging process and not a melting process, wherein the gradual decrease of the welding current back to zero improves the properties of the hot forged joint.

In an embodiment the welding current is fed as one single pulse, whereby the necessary amount of energy is efficiently applied to the area of the metal sheets at the location of the projection.

In an embodiment the welding current is a direct current, which has a high energy density and which enables to break an oxidation layer on the outer faces of the metal sheets at the line of contact with the projection.

In a quantified embodiment the first time interval is maximal 10 milliseconds.

In particular, the first time interval is maximal 5 milliseconds.

More particularly, the first interval is maximal 1 millisecond.

By keeping the first interval relatively short, the more time remains to apply the maximal welding current for the following hot forging process.

In a quantified embodiment the second time interval is 10 to 20 milliseconds, in which the projection is hot forged flattened.

In particular, the second time interval is 15 milliseconds.

In a quantified embodiment the third time interval is at least 5 milliseconds, whereby the hot forged joint and thereby a strong structural weld is obtained without or with an acceptable minimum amount of shrinking cracks or inclusions.

In an embodiment thereof the third time interval is maximal the duration of the second time interval.

In an embodiment the fourth time interval is at least as long as the sum of the first time interval, the second time interval and the third time interval, whereby a strong structural weld is obtained without or with an acceptable minimum amount of shrinking cracks or inclusions.

In a quantified embodiment thereof the fourth time interval is at least 100 milliseconds.

In particular, the fourth time interval is at least 300 milliseconds.

In a quantified embodiment the pressure force is 70-280 Newton per square millimeter of the projection in projection perpendicular to the main surface of the first metal sheet. This pressure force is substantially higher when compared to projection welding of iron sheets.

In particular, the pressure force is 160 Newton per square millimeter of the projection in projection perpendicular to the main surface of the first metal sheet.

In a quantified embodiment the maximum welding current is 2.5 to 5 kiloamperes per square millimeter of the projection in projection perpendicular to the main surface of the first metal sheet. This welding current is substantially higher when compared to projection welding of iron sheets.

In particular, the maximum welding current is 4 kiloamperes per square millimeter of the projection in projection perpendicular to the main surface of the first metal sheet.

In an embodiment the second metal sheet is of a non-ferrous metal or metal alloy having as main component aluminum of magnesium.

According to a third aspect, the invention provides a method for projection welding a second metal sheet above a first metal sheet by means of projection welding with a projection welding apparatus, wherein the first metal sheet is of a non-ferrous metal or metal alloy having as main component aluminum or magnesium, wherein the first metal sheet comprises multiple elongate projections that locally extend above the main upper surface of the first metal sheet to come into contact with the main lower surface of the second metal sheet, wherein the projection welding apparatus comprises a first welding electrode and a second welding electrode that engage simultaneously onto the second metal sheet at the position of two projections to exert a pressure force onto the metal sheets and to subsequently feed a current through the metal sheets, wherein the method comprises feeding a welding current through the welding electrodes according to a pulse, wherein the pulse comprises in series a first trajectory over a first time interval in which the current rises from zero to a maximum current, a second trajectory over a second time interval in which the maximum current is present, a third trajectory in which the current gradually decreases back to zero over a third time interval, and a fourth trajectory in which the welding current over a fourth time interval is kept zero while the pressure force is still applied.

This method relates to a single sided serial weld configuration in which two projection welds are made simultaneously by the welding electrodes that are at the same side of the work piece. The second sheet can be made of iron, or the second metal sheet can be made of a non-ferrous metal or metal alloy having as main component aluminum of magnesium like the first sheet. This method has the same properties and advantages as the double sided single weld configuration as described before and are therefore not repeated here.

In a quantified embodiment of this single sided serial weld configuration the second time interval is 20 to 40 milliseconds.

In particular, the second time interval is 30 milliseconds.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1A:
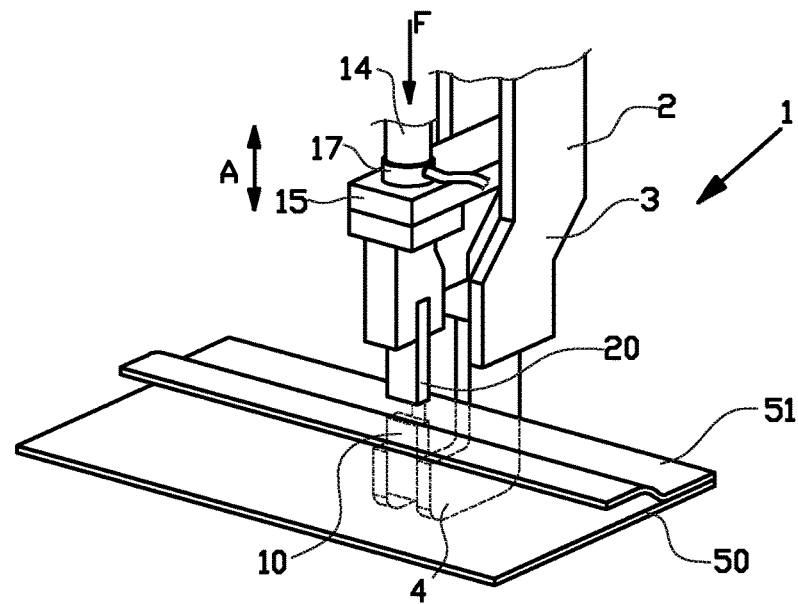
FIGS. 1A-1C are an isometric view, a side view and a detail of a projection welding apparatus according to the invention for projection welding aluminum sheets according to the invention in a double sided single weld configuration.
Figure 1B:
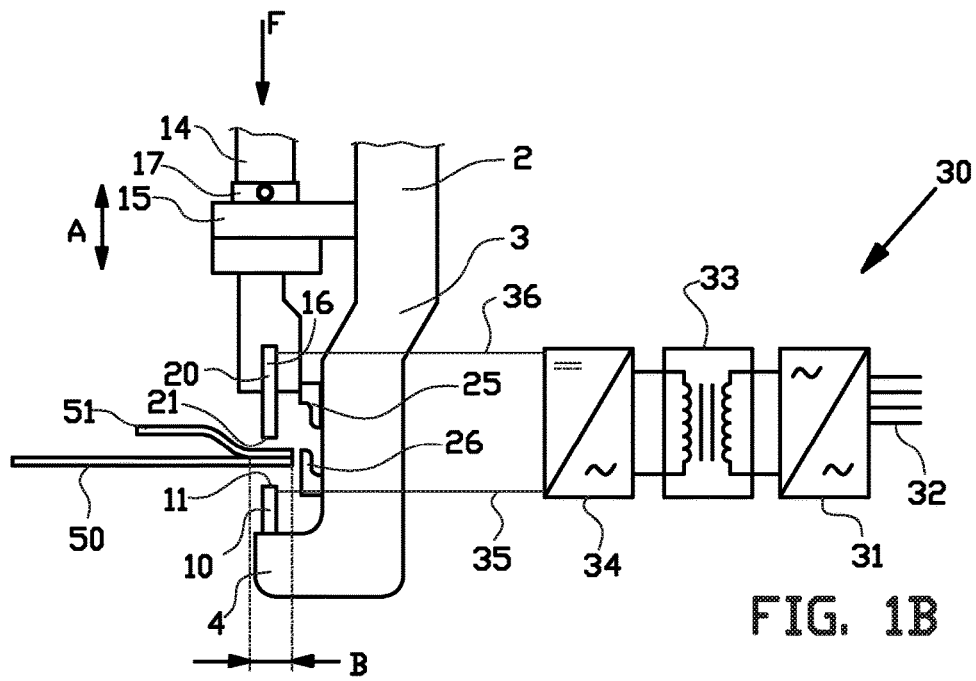
Figure 1C:
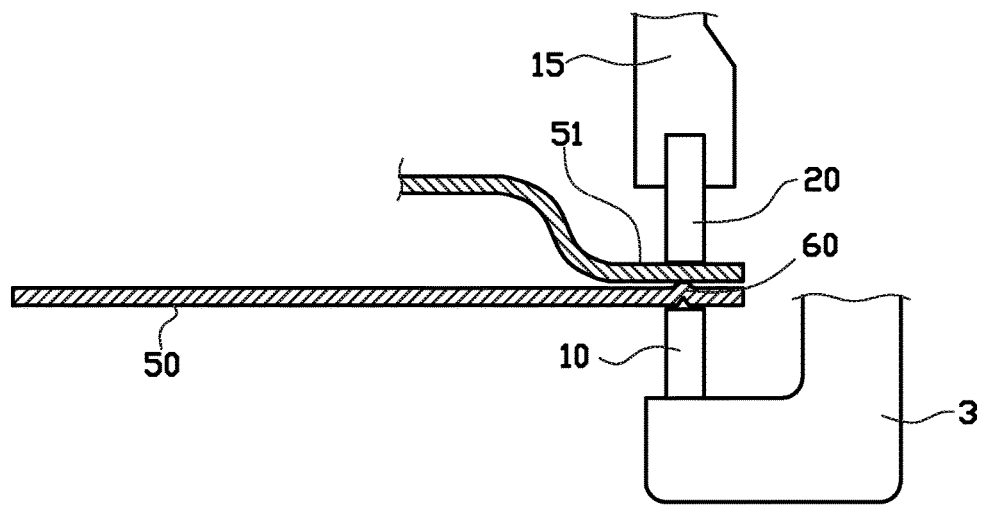

FIGS. 1A-1C are an isometric view, a side view and details of a projection welding apparatus 1 according to the invention for welding in a double sided single weld configuration. The projection welding apparatus 1 is configured for projection welding of non-ferrous metal sheets according to the invention, in particular for projection welding sheets of aluminum or magnesium and alloys thereof having at least 80%, preferably 90% of its weight aluminum or magnesium as the main component, and an additional fraction or dotation of copper, manganese, silicon, zinc or combinations thereof. The aluminum alloys have an international four letter codes generally indicated 1xxx, 2xxx, 3xxx, 4xxx, 5xxx, 6xxx, 7xxx and 8xxx, wherein specific examples are aluminum alloys 1050, 1080, 1200, 2017, 2024, 3003, 3004, 3103, 4043, 5000, 5005, 5052, 5082, 5083, 5086, 5180, 5240, 5251, 5356, 5454, 5556, 6005, 6060, 6061, 6063, 6082, 6111, 6161 6262, 7020 and 7075. The magnesium alloys have a code generally indicated XX yy, wherein yy indicates the percentage of the weight in integers of XX that indicates the additional fraction or dotation, in which A is aluminum, C is copper, E is rare earth elements, H is thorium, K is zirconium, L is lithium, M is manganese, Q is silver, S is silicon, W is yttrium and Z is zinc. Specific examples are magnesium alloys AZ 31, AZ 61, AZ 80, AZ 80, ZK 60 and ZM 21. Such sheets, preferably the types 5xxx, 6xxx and AZ yy, can be used in the automotive industry for manufacturing both lightweight body parts of cars as well as lightweight hang-on parts of cars, such as doors and fenders. These parts can be fully made of these sheets, but there is also a need for car parts that combine these sheets with iron sheets. An example thereof is an iron car body with a roof of aluminum sheet. The thickness of the sheets is between 0.5 millimeters and 5 millimeters, and typically about 0.8-2 millimeters.

In the exemplary embodiment described hereafter the projection welding apparatus 1 is described for projection welding these types of non-ferrous metal sheets to each other or to an iron sheet, wherein an example is given for welding two aluminum alloy sheets of the 6xxx series.

The projection welding apparatus 1 as shown in FIGS. 1A-1C comprises a welding unit or welding gun 2 that is carried on a robot arm, that is not further shown, to be manipulated along a work piece to be welded. Alternatively the welding gun 2 is stationary installed and the work piece is manipulated with respect to the welding gun 2 by a robot arm. As a further alternative the welding gun 2 is stationary installed and the work piece is clamped in a fixture. The welding gun 2 comprises an electrically conducting frame 3 with the shape of a jaw that is mounted on the robot arm, and an electrically conducting pressure head 15 that is movable with respect to the frame 3. The frame 3 and the pressure head are made of copper or aluminum. The pressure head 15 comprises a first holder 16 wherein a replaceable first welding electrode 20 is mounted having a flat lower welding surface 21. The frame 3 comprises at its lower side a second holder 4 wherein a replaceable second welding electrode 10 is mounted having a flat upper welding surface 11. The first welding electrode 20 and the second welding electrode 10 are made of a copper alloy that is optimized for a long service life. The projection welding apparatus 1 is used to make projection welds between two superimposed metal sheets, wherein the contact surface with the first welding electrode 20 remains blemish free. This side of the sheet is ready to be finished with a coating without intermediate treatments such as spot repair and polishing.

The first welding electrode 20 and the second welding electrode 10 are mutually aligned, wherein the upper welding surface 11 faces the bottom welding surface 21. The pressure head 15 is slidably guided along the frame 3 for linear movement in direction A with respect to the frame 3. This stroke is powered by means of a pneumokinetic drive. The pneumokinetic drive comprises in series a pneumatic cylinder, a spring and a drive rod 14 of which only the end is shown that is connected to the pressure head 15 via a pressure sensor 17. The pneumatic cylinder moves the drive rod 14 downwards towards the workpiece. When the upper welding electrode 20 touches the work piece the pneumatic cylinder will compress the spring to a preset pressure force F. The compressed spring enables a fast follow up of small displacements of the first welding electrode 20 during welding. On the pressure head 15 and the frame 3 two cooperating anchors 25, 26 are provided that engage each other to keep the welding electrodes 10, aligned while the pressure force F is applied to the work piece. The welding electrodes 10, 20 can form part of a cooling water circuit to cool down the welding electrodes 10, 20 at short cycle welding. The pressure sensor 17 monitors the pressure force F and its course to ensure a proper welding process as described hereafter.

The welding electrodes 10, 20 are connected to an electrical power circuit 30 that is schematically indicated in FIG. 1B. The electrical power circuit 30 comprises an inverter 31 having its input 32 connected to a conventional mains, which is a three phase 230/400V, 50 Hz mains in this example. The inverter 31 is configured to convert the three phase mains into a single phase alternating current output having a high frequency of about 1 kHz. The output of the inverter 31 is connected to a transformer 33 that is mounted on the frame 3 close to the welding electrodes 10, 20. The transformer 33 transforms the high voltage high frequency alternating current from the inverter 31 into a low voltage, high current, same high frequency output. The output of the transformer 33 is connected to a rectifier 34 that transforms the alternating current to a direct current. The two outputs 35, 36 of the rectifier 34 are connected with the two welding electrodes 10, 20. The voltage and current of the inverter 31 are accurately controlled in time, which leads to a specific welding current through the welding electrodes 10, 20 with a characteristic of which the parameters are described hereafter. It will be understood that "upper" and "lower", and "first" and "second" are non-limiting, relative terms for the two sheets 50, 51, of which one is provided with the projection 60. The sheets 50, 51 have a constant thickness between the subsequent projections 60. The sheets 50, 51 may have a constant thickness over the entire main plane, that is except for the spots where the projections 60 are actually present. The sheets 50, 51 may have an outer oxidation layer at the facing outer surfaces.

Figure 1D:
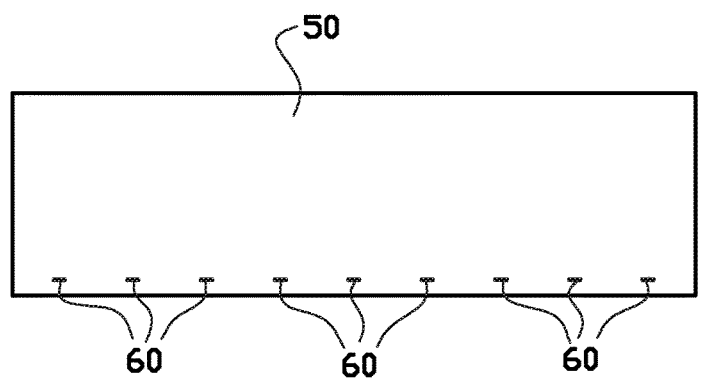
FIG. 1D an isometric view of the lower aluminum sheet with projections as shown in FIG. 1A.

As shown in FIGS. 1A-1C, two aluminum sheets 50, 51 to be welded together are positioned superimposed between the welding electrodes 10, 20. The lower aluminum sheet 50 is also shown separately in FIG. 1D. As shown in FIGS. 1C and 1D, the lower aluminum sheet 50 comprises multiple projections 60 that protrude towards the lower surface of the upper aluminum sheet 51. The projections 60 are formed in the aluminum sheet 50 in an earlier stage as will be described hereafter.

Figure 2A:
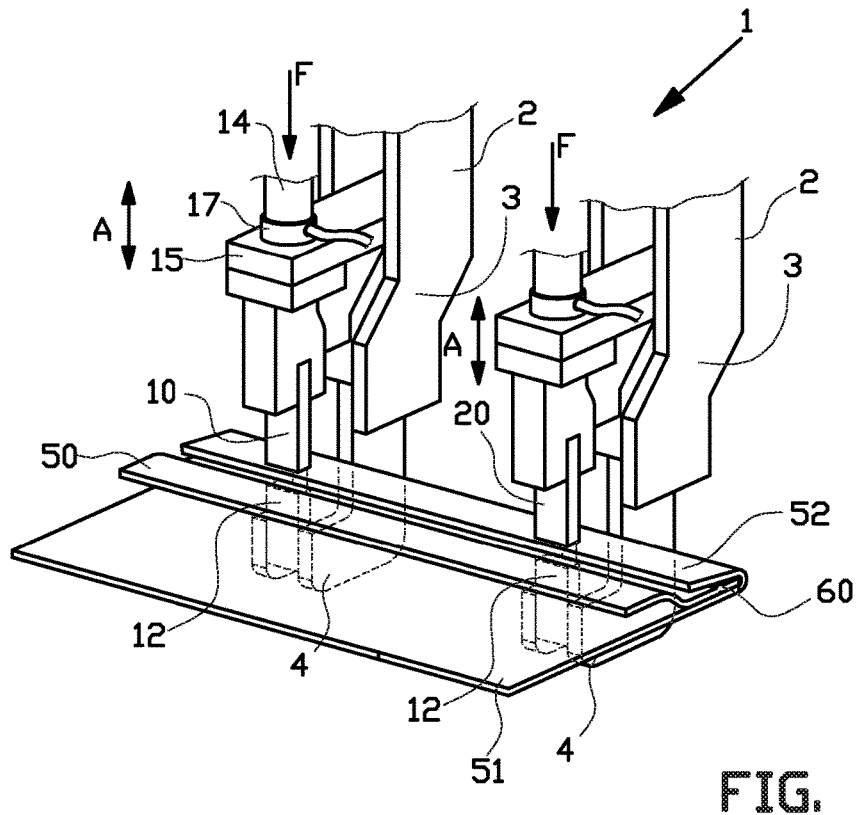
FIGS. 2A-2C are an isometric view, a side view and a detail of the projection welding apparatus according to the invention for projection welding aluminum sheets according to the invention in a single sided serial weld configuration.
Figure 2B:
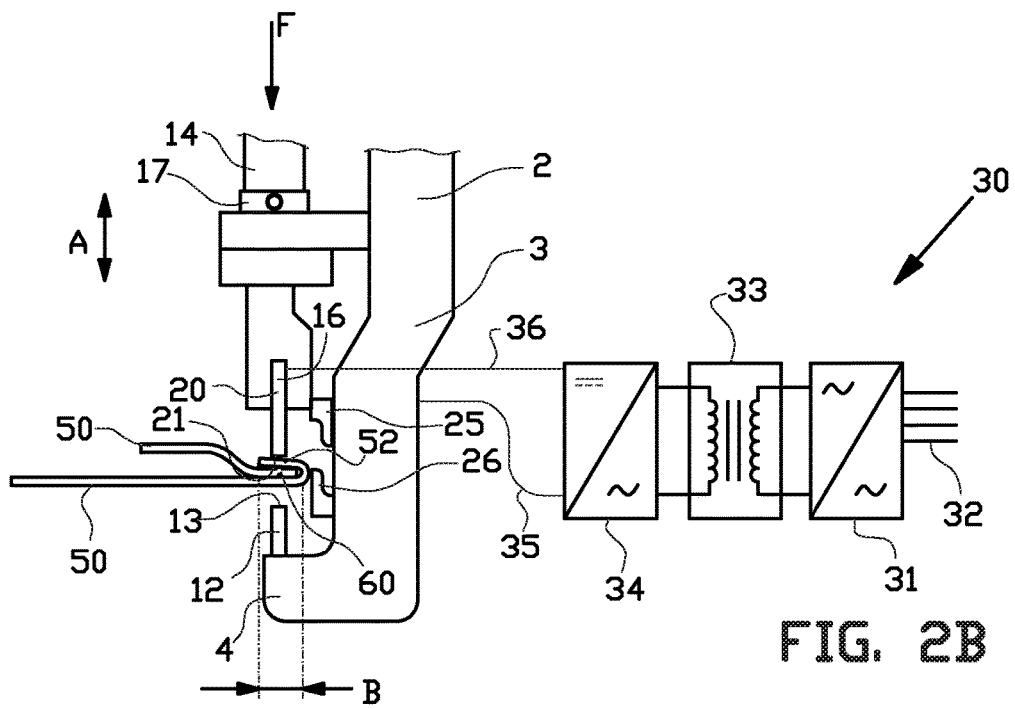
Figure 2C:
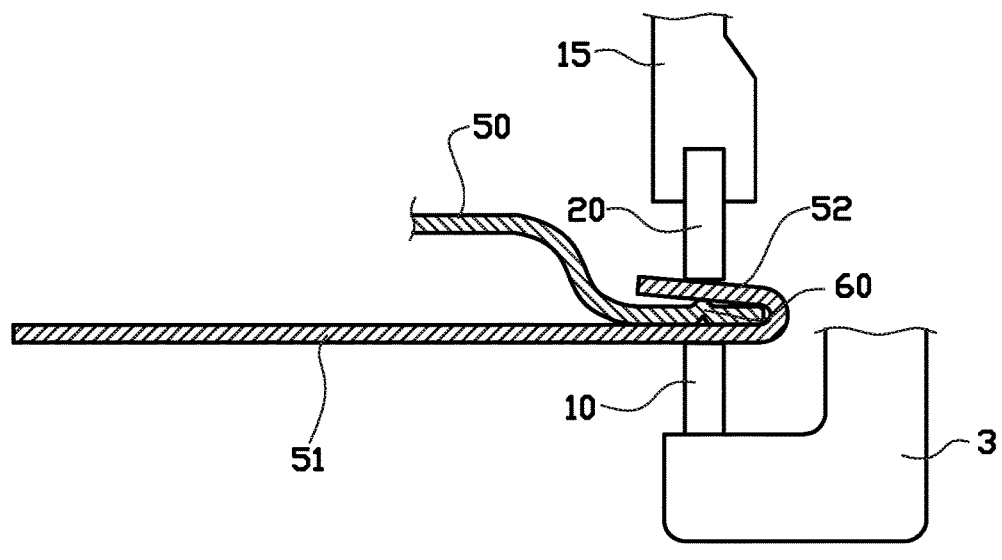

FIGS. 2A-2C show a configuration for single sided serial welding. In this alternative configuration the lower aluminum sheet 51 is provided with a hem part 52 that is bent back to enclose the edge of the enclosed aluminum sheet 50 that is provided with the projections 60. In this configuration the projection welding apparatus 1 comprises two welding guns 2 that act simultaneously. The welding guns 2 each comprise a welding electrode 10, 20 in the first holder 16 and non-conductive pins 12 are mounted in the second holders 4. Alternatively the second holders 4 are replaced by a supporting framework for the work piece that holds the sheets 50, 51 mutually positioned during welding. The two outputs 35, 36 of the rectifier 34 are connected with the two welding electrodes 10, 20. The configuration of the projection welding apparatus 1 as shown in FIGS. 2A-2C can also be used for single sided serial welding of the work piece as shown in FIGS. 1A-1C.

For all configurations the welding electrode(s) (10), 20 in the upper holder(s) 16 are brought down in direction A to abut the upper aluminum sheets 51 or the hem part 52 at the position of the projection 60. During the welding process a specific pressure force F and a welding current according to a specific characteristic in time are applied, whereby the projection 60 fully collapses and becomes a strong structural weld by hot forging, having optimal material properties as will be described hereafter. After welding the lower surface of the upper sheet 51 or the hem part 52 is in tight abutment with the surface around the collapsed projection 60. For all configurations there is for each welding spot only one projection 60 that forms the weld between the sheets 50, 51. In other words, straight above the entire length of the projection 60 the lower surface of the upper aluminum sheet 51 that faces the projection 60 is straight and extends parallel to the main plane of the upper aluminum sheet 51. In the first configuration according to FIGS. 1A-1C the welding current passes mainly through the projection 60 that is confined between the welding electrodes 10, 20. In the second configuration according to FIGS. 2A-2C the welding current passes through the two projections 60 that are in series via the upper sheet 50, but also a substantial fraction of the current passes directly through the hem part 52 that is parallel therewith. This is compensated in the current characteristic as described hereafter.

In all configurations the work piece has a flange with a width B comprising the distributed structural welds, wherein there is a need in the art to keep the width B of the flange as small as possible. The projection welding apparatus 1 is in all configurations adapted to weld flanges with a width of 4 to 10 millimeter, preferably 6 to 8 millimeter.

Figure 3A:
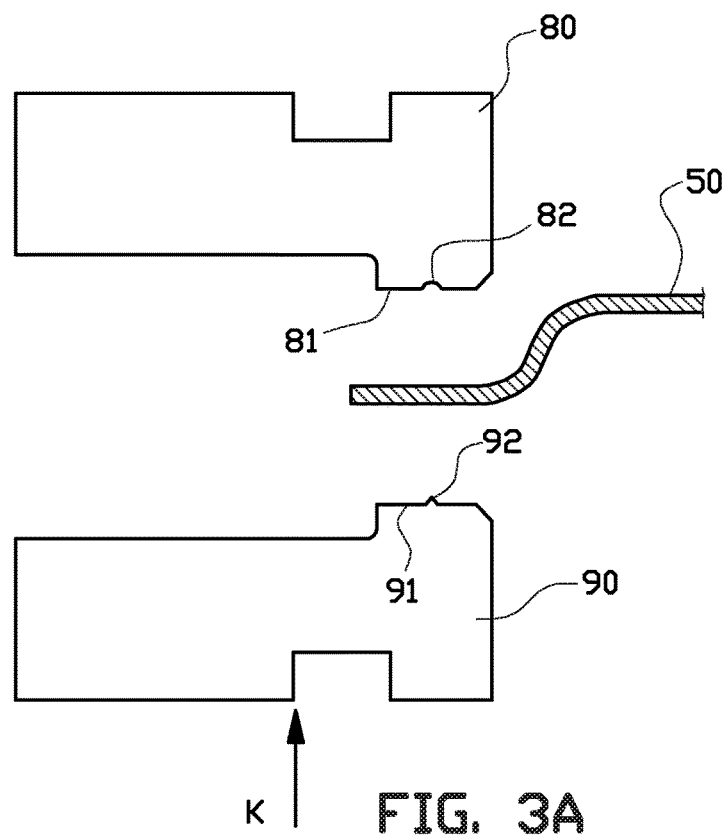
FIGS. 3A and 3B show the forming of the projections in one of the aluminum sheets of FIGS. 1A-1C, 2A-2C.
Figure 3B:
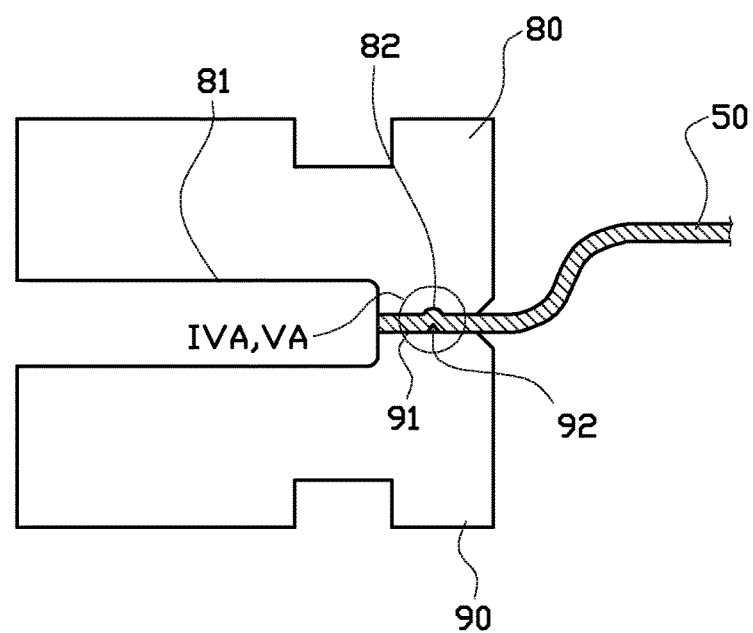
Figure 4A:
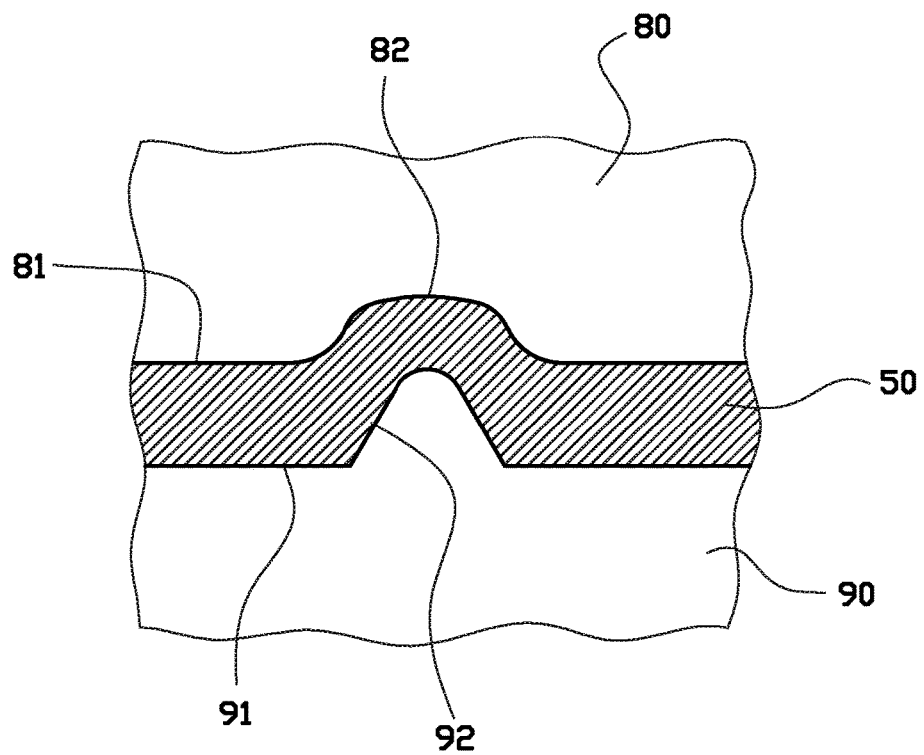
FIGS. 4A and 4B show details of the forming of the projections of FIGS. 3A and 3B.

The projections 60 are formed in an earlier stage by pressing the aluminum sheet 50 between a first form block 80 and a second form block 90 of hardened steel as shown in FIGS. 3A and 3B. The first form block 80 comprises a flat bottom surface 81 having an elongate dimple 82. The second form block 90 comprises flat top surface 91 and a protruding punch 92 with a straight triangular cross section and a sharp but rounded top edge that is aligned with the dimple 82. In the art sometimes the entire first form block 80 is called the "die" and the entire second form block 90 is called the "punch". At forming the projection 60 the aluminum sheet 50 is positioned against the flat bottom surface 81 of the first form block 80 and the second form block 90 is moved and pressed in direction K against the aluminum sheet 50 until the flat top surface 91 is in tight abutment with the bottom surface of the aluminum sheet 50. At this forming stroke the punch 92 penetrates the aluminum sheet 50 and locally plastically deforms or cold forges the material to completely fill up the space inside the dimple 82, whereby the shape of the upper surface of the projection 60 is fully complementary to the inner surface of the dimple 82. In the art the upper surface of the projection 60 is therefore sometimes called the "dimple". The situations during and after penetration are shown in detail in FIGS. 4A and 5A.

Figure 5A:
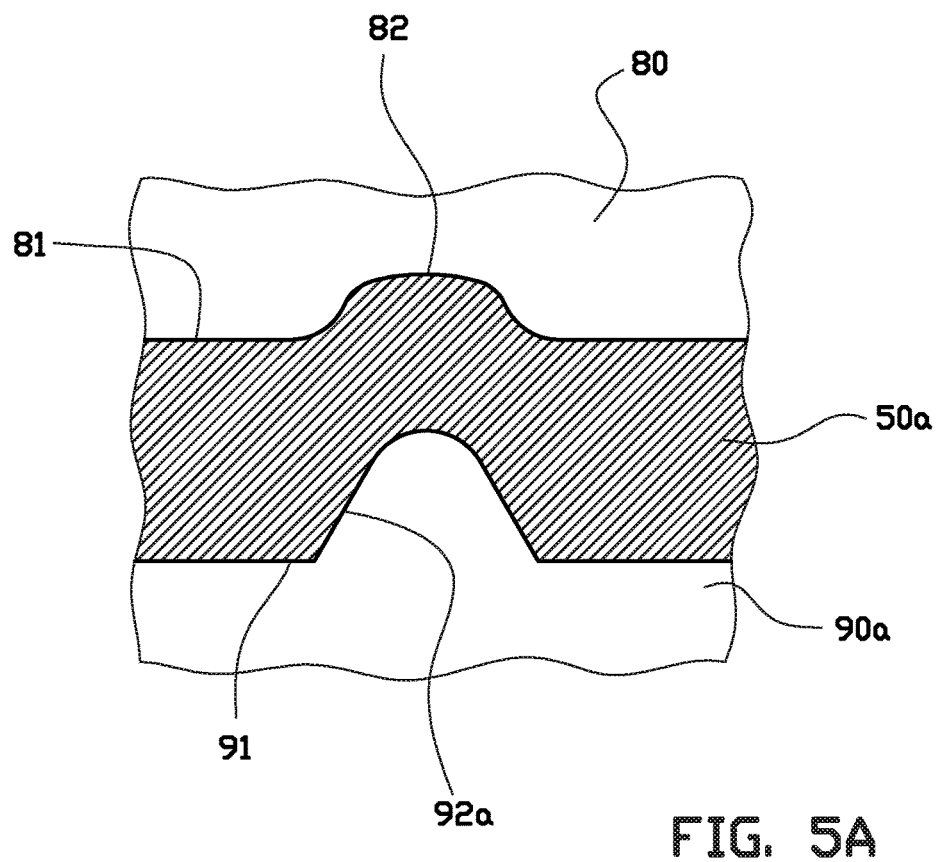
FIGS. 5A and 5B show details of the forming of the projections in an aluminum sheet that is thicker than the aluminum sheet of FIGS. 1A-1C, 2A-2C.
Figure 5B:
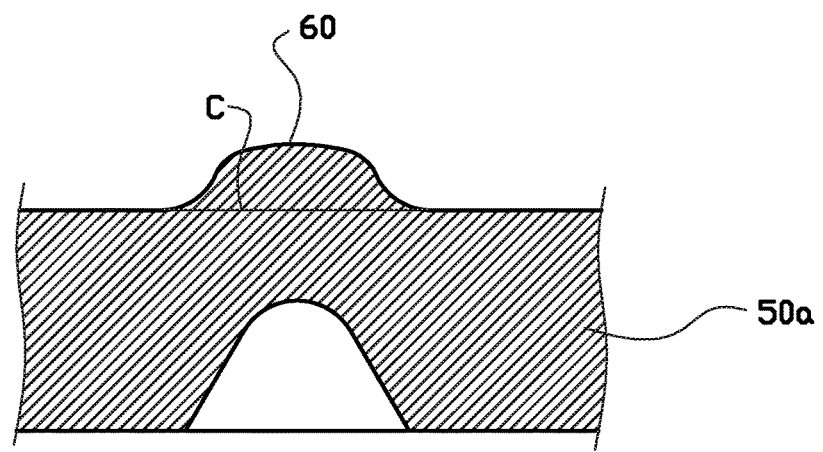

FIGS. 5A and 5B show the forming of a projection 60 according to the invention in an aluminum sheet 50a with a different, in this example higher thickness. At forming the projection 60 the same first forming block 80 with the same dimple 82 is used, while an alternative second forming block 90a is used having the same upper surface 91 and an alternative punch 92a with a straight triangular cross section and a sharp but rounded top edge. The punch 90a is higher and the base is broader than the punch 90 for the thinner aluminum sheet. At the forming stroke the punch 92a penetrates the aluminum sheet 50 and locally plastically deforms the material to completely fill the space inside the dimple 82, whereby the shape of the upper surface of the projection 60 is again complementary to the inner surface of the dimple 82.

Figure 6A:
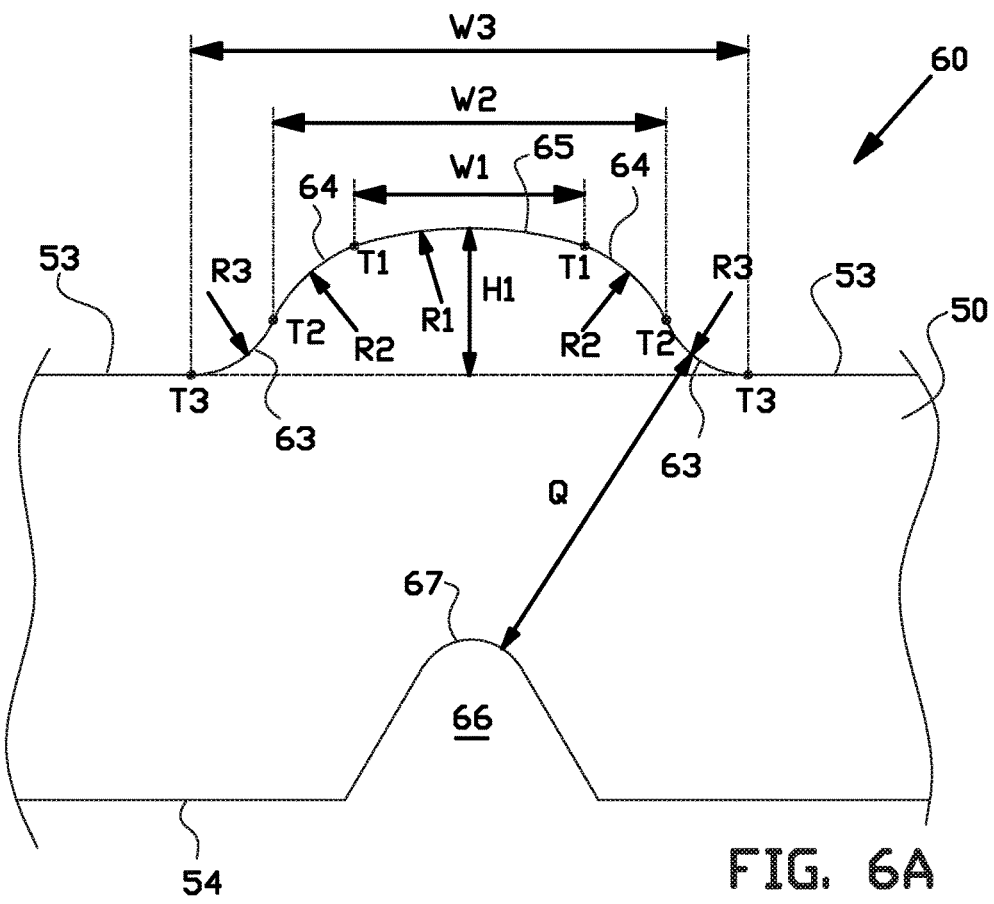
FIGS. 6A and 6B show a cross section and an isometric view of the upper face of the projection in the aluminum sheet of FIG. 1C.
Figure 6B:
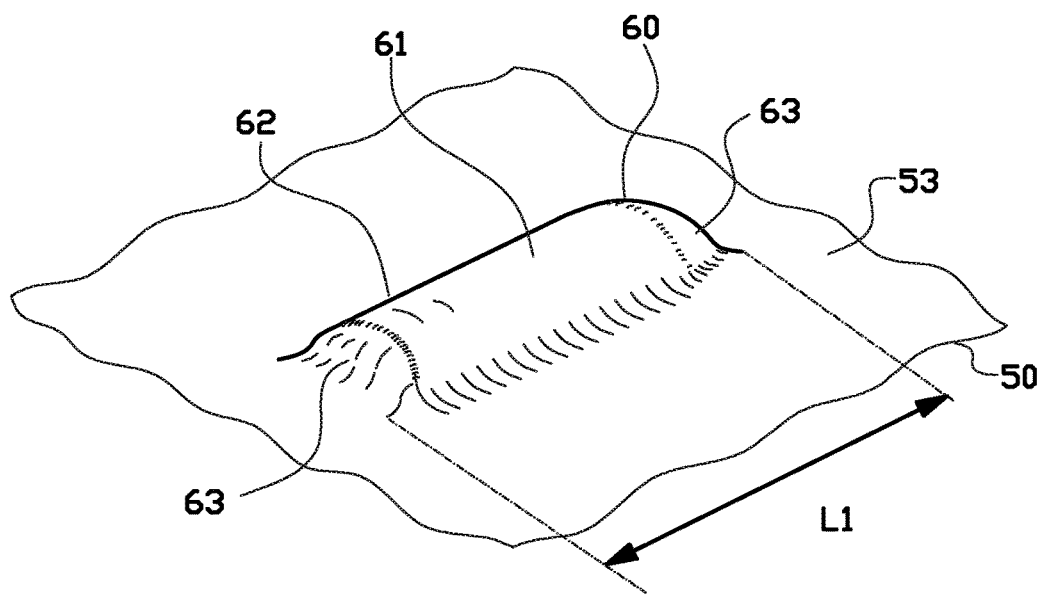

The dimple 82 has for all sheet thicknesses the same specific geometry that is complementary transferred to the upper surface of the projection 60 as formed. The geometric parameters of the projection 60 are shown in detail in FIGS. 6A and 6B. As shown in FIG. 6B, the elongate projection is substantially straight or rectilinear in its longitudinal direction. As also shown in FIG. 6A, the projection 60 has an upper surface 61 that extends above the main upper surface 53 of the aluminum sheet 50. The upper surface 61 comprises a an elongate, prismatic middle portion 62 of which the constant cross section is shown in FIG. 6A, and two end portions 63 where the ends of the middle portion 62 symmetrically merges into the main upper surface 53 of the aluminum sheet 50.

As shown in FIG. 6A, the middle portion 62 of the upper surface 61 comprises a convex first section 65 with a first radius R1 that is not endless. The convex first section 65 defines in its middle the top height H1 of the upper surface 61 with respect to the main upper surface 53 of the aluminum sheet 50. The top height is between 0.35 millimeters and 0.55 millimeters, preferably about 0.45 millimeters, for all sheet thicknesses. The convex first section 65 symmetrically merges at both sides into convex second sections 64 with a smaller second radius R2. These first transitions T1 from the first convex section 65 into the second convex sections 64 are smooth. In mathematical terms the tangents of the merging sections 64, 65 coincide at the first transitions T1. The concave first section 65 has a first width W1 between the first transitions T1.

The convex second sections 64 symmetrically merge into concave third sections 63 with a third radius R3. These second transitions T2 from the convex second sections 65 into the concave third sections 64 are smooth. In mathematical terms the tangents of the merging sections 64, 65 coincide at the second transitions T2 and change their direction. The convex first section 65 and the convex 15 second sections 64 have a total second width W2 between the second transitions T2. The concave third sections 63 symmetrically merge into the main upper surface 53 of the aluminum sheet 50. These third transitions T3 from the concave third sections 63 into the straight main upper surface 53 are smooth. In mathematical terms the tangents of the merging section 63 and the straight main upper surface coincide at the third transitions T3. The upper surface 61 has a total third width W3 between the third transitions T3, which is the total width of the projection 60 above the main upper surface 53 of the aluminum sheet 50.

Abovementioned transitions T1, T2, T3 are notional points in the cross section as shown in FIG. 6A and notional lines that extend parallel to the main upper surface 53 of the aluminum sheet 50. The third transitions T3 form the base lines of the upper surface 61 along the long sides of the projection 60. The two end portions 63 have in a longitudinal section and taken, from the middle portion 62 the same outer contour as the cross section of the middle portion 62. The upper surface 61 of the projection 60 has a total length L1. As shown in FIG. 6A, the projection 60 has a minimal material thickness Q taken between the upper surface 61 and the surface of the depression 66. The projection 60 forms a local narrowing in the sheet material.

For abovementioned geometric parameters specific values and ratios applies:

The ratio first radius R1/second radius R2 is at least 4. Preferably the ratio first radius R1/second radius R2 is 4 to 5. More preferably the ratio first radius R1/second radius R2 is about 4.5. The ratio first width W1/second width W2 is between 0.60 and 0.90. Preferably the ratio first width W1/second width W2 is about 0.70 and 0.80. More preferably the ratio first width W1/second width W2 is about 0.75. These ratios in geometric parameters result in an upper surface 61 having a relatively broad convex first section 65 at the top but still having the largest height H1 only in the middle thereof, which forms the initial line of contact with the lower surface of the aluminum sheet 51 or hem part 52 to be welded to the sheet 50 with the projection 60, and therefore forms the passage for the initial welding current. Already when the pressure force F is applied the broad convex first section 65 leads to a progressively growing initial contact surface at the top due to local elastic and plastic depression of the cold material. The welding current will be locally conducted very well via this contact surface only.

The third width W3 is between 1 and 4 millimeter. Preferably the third width W3 is about 1.8 millimeter. The length L1 is between 2 and 12 millimeter. Preferably the length L1 is 6 millimeter.

Figure 4B:
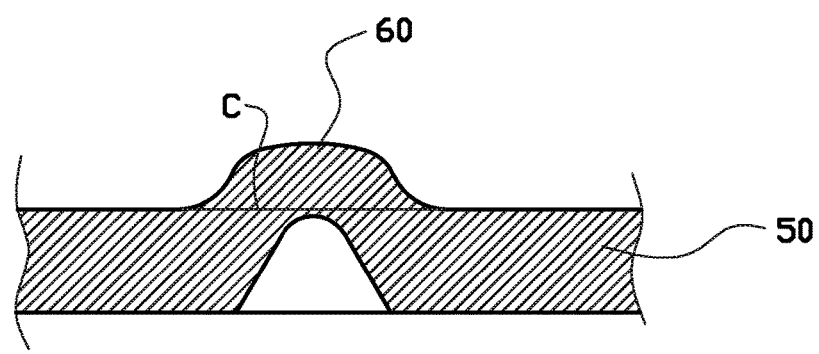

The minimal material thickness Q is more than 0.3 millimeter. Preferably the minimal material thickness Q is more than 0.45 millimeter. This already applies for sheet thicknesses of 0.8 to 1 millimeter. The top 67 of the indentation 66 that is left behind by the punch 92 is always located below the main upper surface 53 of the aluminum sheet 50, which is indicated by the notional line C in FIGS. 4B and 5B, whereby the part of the projection 60 that extends above the main upper surface of the aluminum sheet 50 is full of metal. The minimal material thickness that is thereby obtained ensures that the projection 60 withstands the initial local depression of the cold material. When the welding electrodes 10, 20 are brought into contact with the work piece, the pressure force F of the second holder 16 with respect to the first holder 4 is monitored in time to verify the structural integrity of the projection 60. When the pressure force F and its course in time are not within prescribed limits it is concluded that the projection 60 cannot be used for a blemish free weld. The welding current is then not applied. This can be because the projection 60 has already been collapsed or that a projection was not present at all.

Figure 7:
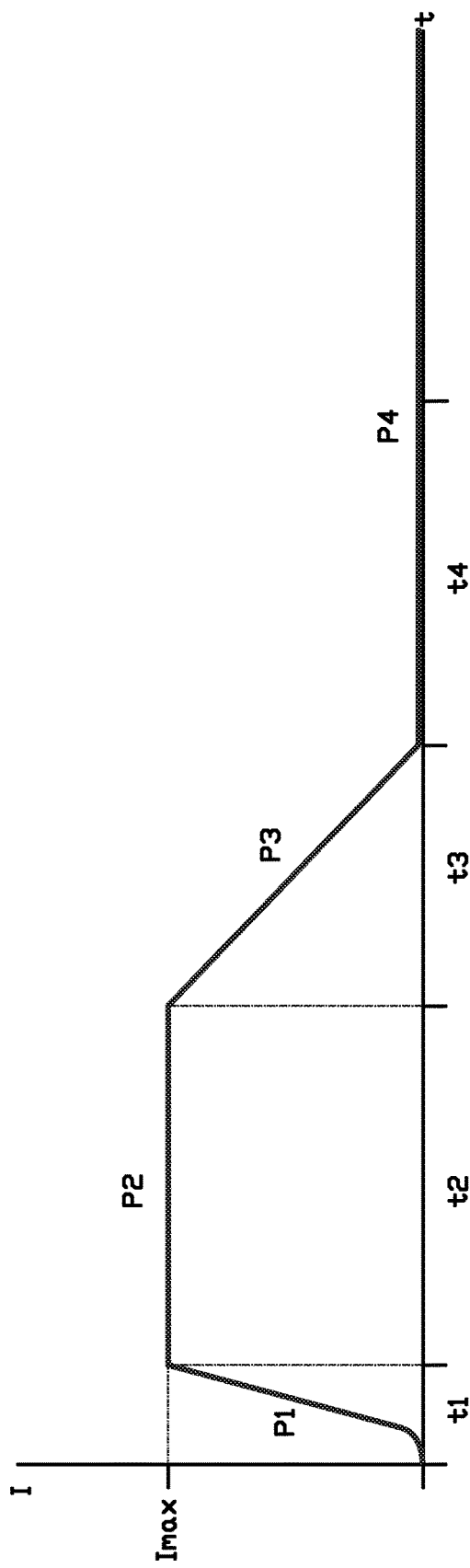
FIG. 7 shows the diagram of the welding current that is applied by the projection welding apparatus during welding.

FIG. 7 shows the diagram of the welding current that is fed through the welding electrodes 10, 20 of the projection welding apparatus 1 during welding. The welding current is applied, as one single or continuous pulse of unipolar direct current with specific parameters for the welding current I in time t. The current pulse is started after the constant pressure force F is applied and the structural integrity of the projection 60 has been confirmed. At the moment that the constant pressure force F is initially applied, the reduction of the top height due to the local elastic and plastic depression of the cold material is limited to 2%. This is obtained by the specific form features of the projection 60, in particular the applied first radius R1 and second radius R2 and the ratio there between, and as the projection 60 is solid above the main upper surface 53 the first aluminum sheet 50. Due to the excellent resistance against depression under the applied pressure force F any oxidation between the contacting surfaces is broken down. Therefore a prior step of removal of the oxidation as known in the art is not necessary.

The current pulse comprises in series a first trajectory P1 in which the welding current (Amperes) over a time interval t1 increases rapidly from 0 amperes to the maximum current Imax, a second trajectory P2 in which the welding current over a second time interval t2 is substantially constant or constant, a third trajectory P3 in which the welding current over a time interval t3 proportionally decreases (according to a straight line in the diagram with linear scales) from the maximum current Imax to 0 amperes. This is immediately followed by fourth trajectory P4 in which over a remaining time interval t4 the welding current is kept at 0 amperes while the pressure force F is still applied by the welding electrodes 10, 20. After this fourth trajectory P4 the welding electrodes 10, are retracted and positioned on the next welding location. For abovementioned pulse parameters specific values and ratios applies.

The first trajectory P1 has an extreme short rise time or first time interval t1 of maximal 10 milliseconds. Preferably the first time interval t1 is maximal 5 milliseconds. More preferably the first time interval t1 is maximal 1 millisecond.

For the double sided single weld configuration the second trajectory P2 with the constant current has a second time interval t2 between 10 and 20 milliseconds. Preferably the second time interval t2 is about 15 milliseconds. For the single sided serial weld configurations as described under reference to FIGS. 2A-2C the second trajectory P2 with the constant current has a second time interval t2 between 20 and 40 milliseconds. Preferably the second time interval t2 is about 30 milliseconds.

The third trajectory P3 with the proportional decrease has a third time interval t3 of at least 5 milliseconds. Preferably the third time interval t3 is maximally equal to the second time interval t2.

The first trajectory P1 and the third trajectory P3 form an asymmetric trapezium, wherein the first time interval t1 is shorter than the third time interval t3.

Preferably, the first time interval t1 is shorter than half of the third time interval t3.

The fourth trajectory P4 has a fourth time interval t4 that is at least as long as the sum of the first time interval t1, the second time interval t2 and the third time interval t3 in which the current has been fed.

Preferably the fourth time interval t4 is at least 100 milliseconds. More preferably the fourth time interval t4 is about 300 milliseconds.

These specific pulse parameters ensure that in the end a structural weld with excellent material properties is obtained at the earlier place of the projection 60. The projection 60 itself causes the welding current to pass at the location of the projection 60 and not through adjacent area of the sheet 50 with the projection 60. The relative short initial first time interval t1 of the first trajectory P1 ensures that the length of the second time interval t2 can be optimal within the total of the first time interval t1, the second time interval t2 and the third time interval t3 in which the welding current is fed and therefore electrical energy is fed to the weld. This short first duration t1 is ensured by the relative large initial contact surface at the broad convex first section 65 after the pressure force F is applied, which relatively large initial contact surface forms the main surface to conduct the welding current. The steep rise of the welding current in the first trajectory P1 is caused by a relatively high welding voltage between the welding electrodes 10, 20 of about 25 to 40 Volts and the relatively high pressure force F as specified here after. The welding voltage, welding current and pressure force are higher than when compared to projection welding of two iron sheets as known in the art. At the end of the first duration t1 the plastic collapse of the heated projection 60 starts. The collapse is caused by the electrical welding energy that is applied over the second trajectory P2. At the end of the second trajectory P2 the projection 60 is fully collapsed and the lower surface of the second aluminum sheet 51 fully abuts the upper surface 53 the first aluminum sheet 50. The collapse of the heated projection 60 takes place in one single continuous stroke in which the electrical welding energy is continuously fed to the weld. The gradual collapse of the projection 60 is not a melting process but a well-controlled hot forging process wherein the projection 60 maintains sufficient strength to counteract its imposed collapse, whereby the materials are welded together. During the next third trajectory P3 the electrical current is proportionally reduced, whereby the amount of energy that is fed to the weld is gradually reduced as well to improve the hot forged joint.

During the fourth trajectory P4 there is no electric welding energy fed anymore while the welding electrodes 10, 20 cool down the weld and continue to apply the pressure force F. In the fourth trajectory P4 the welding energy is retracted in an accelerated but controlled manner over the fourth time interval t4 which is about the same duration as the duration in which the electrical welding current was applied before. In this manner a structural weld with high quality is obtained with minimal shrinking defects.

The welding current for the preferred projection 60 with at the base a length L1 of 6 millimeters and a width W3 of 1.8 millimeters is in absolute values between 30 kA and 50 kA, and preferably about 40 kA. The size of the base defines the projected area of the upper surface 61 of the projection 60 in the plane of the main upper surface 53 of the aluminum sheet 50. When related to the projected area the welding current is between 2.5 kA and 5 kA per $mm^2$ preferably about 4 kA per $mm^2$ of projected area. The second trajectory P2 is about twice as long in the serial weld configuration when compared to the single weld configuration to allow the same amount of energy to be introduced to the projections 60.

The pressure force F for the preferred projection 60 with at the base a length L1 of 6 millimeters and a width W3 of 1.8 millimeters is in absolute values between 800 N and 3000 N, preferably about 1750 N. When related to the projected area the pressure force F is between 70 N and 280 N, preferably about 160 N per $mm^2$ of projected area. The exerted pressure force F is constant or substantially constant during the welding cycle, that is, over or during the first trajectory P1, the second trajectory P2, the third trajectory P3 and the fourth trajectory P4.

Figure 8A:
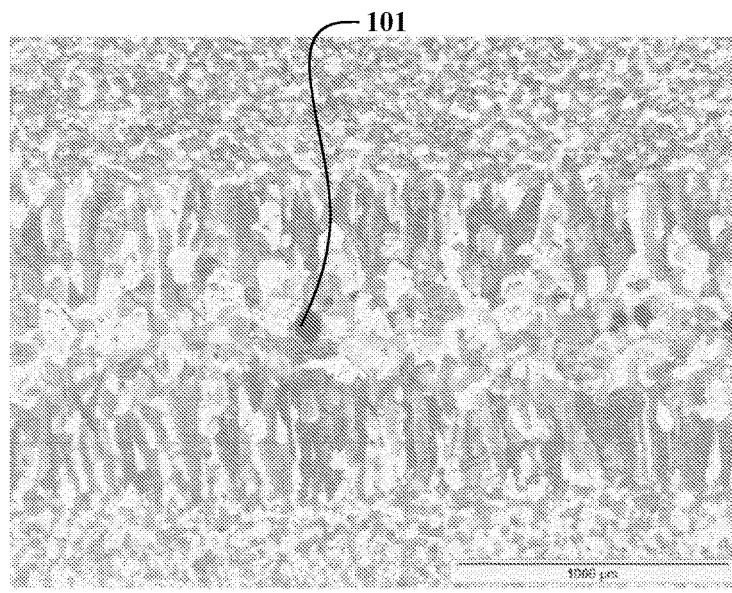
FIGS. 8A and 8B are microscopic views cross sections of the resulting weld when the projection parameters and welding parameters are all applied within the specific ranges according to the invention, and when some of these parameters are applied outside these ranges, respectively.

FIG. 8A is a microscopic view of the structural weld when the welding parameters are applied within the ranges as described before. The weld is free of cracks, and the amount of inclusions and porosity shown as black spots 101 is minimal. This is a weld with a high structural integrity. This weld is even stronger than the material of the aluminum sheets 50, 51 themselves.

Figure 8B:
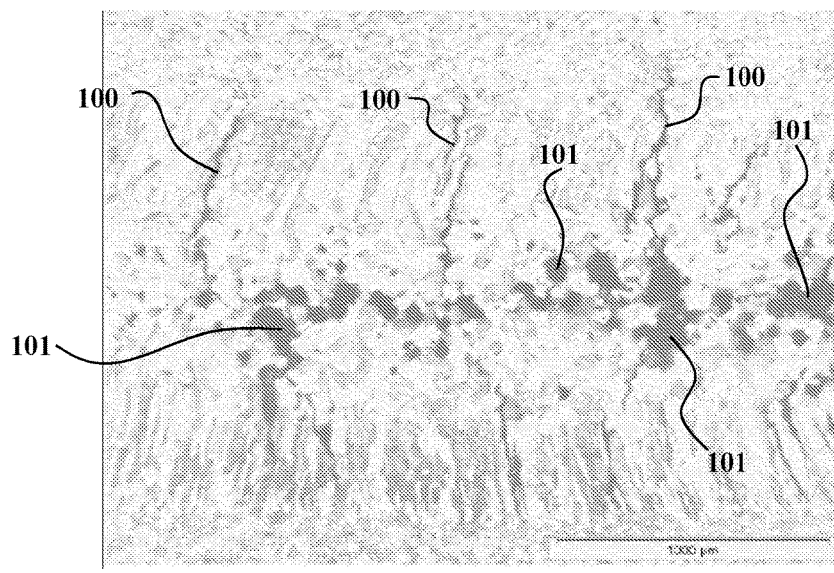

FIG. 8B is a microscopic view of a weld when some of the welding parameters are applied outside the ranges as described before. In particular, in this example the second duration t2 and the third duration t3 have been chosen far outside the specified ranges. As a result the integrity of the material has been changed, wherein the weld comprises distributed, elongated shrinking cracks shown as black lines 100, and numerous of inclusions and porosity shown as black spots 101. The cracks and inclusions have resulted in a weak weld that cannot withstand mechanical loads as required in industry.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. Set of a first metal sheet and a second metal sheet to be welded above the first metal sheet using projection welding, wherein the first metal sheet is of a non-ferrous metal or metal alloy having as main component aluminum or magnesium, wherein the first metal sheet comprises an elongate projection that locally extends above a main upper surface of the first metal sheet to come into contact with the main lower surface of the second metal sheet, wherein the projection comprises an upper surface having a convex first section with a first radius that defines in its middle the top height of the upper surface with respect to the main upper surface of the first metal sheet, a convex second section with a second radius along both elongate sides that merge into the first section, and a third section along both elongate sides that merge into the second sections and into the main upper surface of the first metal sheet, wherein the first transitions of the convex first section into the second convex sections define a first width of the upper surface and wherein the second transitions of the convex second sections into the third sections define a second width of the upper surface, and wherein the third transitions of the third sections into the main upper surface of the first metal sheet define a third width of the upper surface, wherein the first radius is larger than the second radius.

2. Set according to claim 1, wherein the ratio first radius/second radius is at least 4.

3. Set according to claim 1, wherein the ratio first radius/second radius is 4 to 5.

4. Set according to claim 1, wherein the ratio first width/second width is 0.60 to 0.90.

5. Set according to claim 1, wherein the third section is a concave third section with a third radius, wherein the third radius is equal to the second radius.

6. Set according to claim 1, wherein the projection is full of metal of the first metal sheet above the main upper surface of the first metal sheet.

7. Set according to claim 1, wherein the projection comprises an indentation in the lower main surface of the first metal sheet.

8. Set according to claim 1, wherein the second metal sheet is of a non-ferrous metal or metal alloy having as main component aluminum or magnesium.

9. Method for projection welding a second metal sheet above a first metal sheet using projection welding with a projection welding apparatus, wherein the first metal sheet is of a non-ferrous metal or metal alloy having as main component aluminum or magnesium, wherein the first metal sheet comprises one or more elongate projections that locally extend above a main upper surface of the first metal sheet to come into contact with the main lower surface of the second metal sheet, wherein the one or more projections comprise an upper surface having a convex first section with a first radius that defines in its middle the top height of the upper surface with respect to the main upper surface of the first metal sheet, a convex second section with a second radius along both elongate sides that merge into the first section, and a third section along both elongate sides that merge into the second sections and into the main upper surface of the first metal sheet, wherein the first transitions of the convex first section into the second convex sections define a first width of the upper surface and wherein the second transitions of the convex second sections into the third sections define a second width of the upper surface, and wherein the transitions of the third sections into the main upper surface of the first metal sheet define a third width of the upper surface, wherein the first radius is larger than the second radius, wherein the projection welding apparatus comprises a first welding electrode and a second welding electrode that engage onto the first metal sheet and second metal sheet at the position of the projection or that engage simultaneously onto the second metal sheet at the position of two projections to exert a pressure force onto the metal sheets and to subsequently feed a current through the metal sheets, wherein the method comprises feeding a welding current through the welding electrodes according to a pulse, wherein the pulse comprises in series a first trajectory over a first time interval in which the current rises from zero to a maximum current, a second trajectory over a second time interval in which the maximum current is present, a third trajectory in which the current gradually decreases back to zero over a third time interval, and a fourth trajectory in which the welding current over a fourth time interval is kept zero while the pressure force is still applied.

10. Method according to claim 9, wherein the welding current is fed as one single pulse.

11. Method according to claim 9, wherein the welding current is a direct current.

12. Method according to claim 9, wherein the first time interval is shorter than the third time interval.

13. Method according to claim 9, wherein the first time interval is maximal 10 milliseconds.

14. Method according to claim 9, wherein the first time interval is maximal 1 millisecond.

15. Method according to claim 9, wherein the third time interval is maximal the duration of the second time interval.

16. Method according to claim 9, wherein the fourth time interval is at least as long as the sum of the first time interval, the second time interval and the third time interval.

17. Method according to claim 9, wherein the maximum welding current is 2.5 to 5 kiloamperes per square millimeter of the projection in projection perpendicular to the main surface of the first metal sheet.

18. Method according to claim 9, wherein the second metal sheet is of a non-ferrous metal or metal alloy having as main component aluminum or magnesium.

* * * * *